US009747262B1

(12) United States Patent
Liu (10) Patent No.: US 9,747,262 B1
(45) Date of Patent: Aug. 29, 2017

(54) METHODS, SYSTEMS, AND COMPUTER PROGRAM PRODUCTS FOR RETRIEVING INFORMATION FROM A WEBPAGE AND ORGANIZING THE INFORMATION IN A TABLE

(71) Applicant: CA, Inc., Islandia, NY (US)

(72) Inventor: Kevin Liu, Beijing (CN)

(73) Assignee: CA, Inc., Islandia, NY (US)

( * ) Notice: Subject to any disclaimer, the term of this patent is extended or adjusted under 35 U.S.C. 154(b) by 245 days.

(21) Appl. No.: 13/908,445

(22) Filed: Jun. 3, 2013

(51) Int. Cl.
*G06F 17/00* (2006.01)
*G06F 17/22* (2006.01)

(52) U.S. Cl.
CPC .................. *G06F 17/2247* (2013.01)

(58) Field of Classification Search
CPC .............. G06F 17/2247; G06F 17/2705
See application file for complete search history.

(56) References Cited

U.S. PATENT DOCUMENTS

| 7,032,030 | B1* | 4/2006 | Codignotto | .......... G06Q 10/107 707/999.01 |
| 7,493,253 | B1* | 2/2009 | Ceusters et al. | ................... 704/9 |
| 7,542,958 | B1* | 6/2009 | Warren et al. | .................. 706/48 |
| 8,555,157 | B1* | 10/2013 | Fu | ................................ 715/234 |
| 8,695,100 | B1* | 4/2014 | Cosoi | .................... G06F 21/554 713/187 |
| 2004/0064466 | A1* | 4/2004 | Manikutty et al. | ........... 707/100 |
| 2005/0144153 | A1* | 6/2005 | Hattori et al. | .................... 707/1 |
| 2006/0143307 | A1* | 6/2006 | Codignotto | .......... G06Q 10/107 709/246 |
| 2008/0028292 | A1* | 1/2008 | Graham et al. | ............... 715/230 |
| 2010/0064030 | A1* | 3/2010 | Miura | ................... G06F 3/0237 709/219 |
| 2010/0199167 | A1* | 8/2010 | Uematsu | ................. G06F 17/24 715/234 |
| 2010/0228693 | A1* | 9/2010 | Dawson et al. | ................ 706/12 |
| 2012/0311426 | A1* | 12/2012 | Desai et al. | .................. 715/227 |
| 2013/0014002 | A1* | 1/2013 | Cai | ................... G06F 17/30908 715/234 |

* cited by examiner

*Primary Examiner* — Stephen Hong
*Assistant Examiner* — Marshon Robinson
(74) *Attorney, Agent, or Firm* — Sage Patent Group (57) ABSTRACT

A method includes extracting text elements from a webpage, storing the text elements in a data structure, and comparing the text elements in the data structure with a Document Object Model (DOM) structure of the webpage. The extracted text elements may then be processed and exported to a display format. Information from a webpage can, therefore, be extracted for processing using other applications regardless of how the elements were coded to form the webpage.

24 Claims, 5 Drawing Sheets

|  | X1 | X2 | X3 | X4 | X5 | X6 |
|---|---|---|---|---|---|---|
| Y5 |  | Text | Text | Text |  |  |
| Y4 |  |  |  |  | Text |  |
| Y3 |  | Text | Text | Text |  | Text |
| Y3 | Text | Text |  |  |  | Text |
| Y2 | Text |  |  |  |  |  |
| Y1 |  |  |  | Text | Text |  |

FIG. 5

METHODS, SYSTEMS, AND COMPUTER PROGRAM PRODUCTS FOR RETRIEVING INFORMATION FROM A WEBPAGE AND ORGANIZING THE INFORMATION IN A TABLE

BACKGROUND

The present disclosure relates to computing systems, and, in particular, to retrieving information from a webpage.

Information is generally arranged on a webpage in a structured format, often in the form of a table. Visitors to the webpage may wish to collect the information on the webpage and export it to another application or format, such as a spreadsheet. The webpage may provide functionality to export the information thereon to another application or format for further processing, but if the webpage does not provide such functionality, it may be difficult for a visitor to obtain the information from the webpage. A copy-paste operation may be effective in collecting information in some instances, but oftentimes the copy-paste operation fails to work well.

SUMMARY

In some embodiments of the inventive subject matter, a method comprises performing operations as follows using a processor: extracting text elements from a webpage; storing the text elements in a data structure; and comparing the text elements in the data structure with a Document Object Model (DOM) structure of the webpage.

In other embodiments, the method further comprises validating an accuracy of the text elements in the data structure based responsive to comparing the text elements in the data structure with the DOM structure of the web page.

In still other embodiments, the method further comprises exporting the text elements in the data structure to a display format.

In still other embodiments, the display format is one of Extensible Markup Language (XML), a spreadsheet application, and Comma-Separated Values (CSV).

In still other embodiments, comparing the text elements in the data structure with the DOM structure of the webpage comprises using XPath language to query the webpage to obtain a DOM tree comprising nodes of the webpage, wherein the nodes of the webpage represent an organization of the text elements on the webpage.

In still other embodiments, the data structure is a table comprising cells and wherein storing the text elements in the data structure comprises storing the text elements in the cells of the table.

In still other embodiments, the table comprises a plurality of rows, each of the rows containing a subset of the cells such that each of the rows is represented as a row node and each of the cells in the row is represented as a row sub-node. Comparing the text elements in the data structure with the DOM structure of the webpage further comprises comparing an organization of the text elements in the row nodes and the row sub-nodes associated therewith with the nodes of the webpage.

In still other embodiments, storing the text elements in the data structure comprises storing the text elements in an element array along with X, Y position coordinates, creating a plurality of row arrays corresponding to unique Y positions from the first array, respectively, and storing the text elements having a common Y position coordinate in the row array associated with the Y position coordinate.

Other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims.

BRIEF DESCRIPTION OF THE DRAWINGS

Other features of exemplary embodiments will be more readily understood from the following detailed description of specific embodiments thereof when read in conjunction with the accompanying drawings, in which.

DETAILED DESCRIPTION

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As used herein "data" means raw, unorganized facts that need to be processed. Data can be something simple and seemingly random and useless until it is organized. When data is processed, organized, structured or presented in a given context so as to make it useful, it is called "information."

Some embodiments of the inventive subject matter stem from a realization that when a webpage does not provide functionality for exporting information from the webpage to another application or format it may be difficult to retrieve information from the webpage using conventional copy-paste operations. Embodiments according to the inventive subject matter may provide a system that can analyze the position of text elements on a webpage, such as text elements arranged in a table format or other type of structured arrangement, and extract the information. The extracted text elements can then be stored in a data structure that preserves the relationship between the text elements from the webpage. The webpage can be further analyzed to obtain the Document Object Model (DOM) structure of the webpage. The positional relationships between the text elements stored in the data structure can be compared to the DOM structure of the webpage to validate that the text elements have been retrieved accurately and can be exported to another application or display format while maintaining the same relationships between the text elements as on the webpage.

Figure 1:
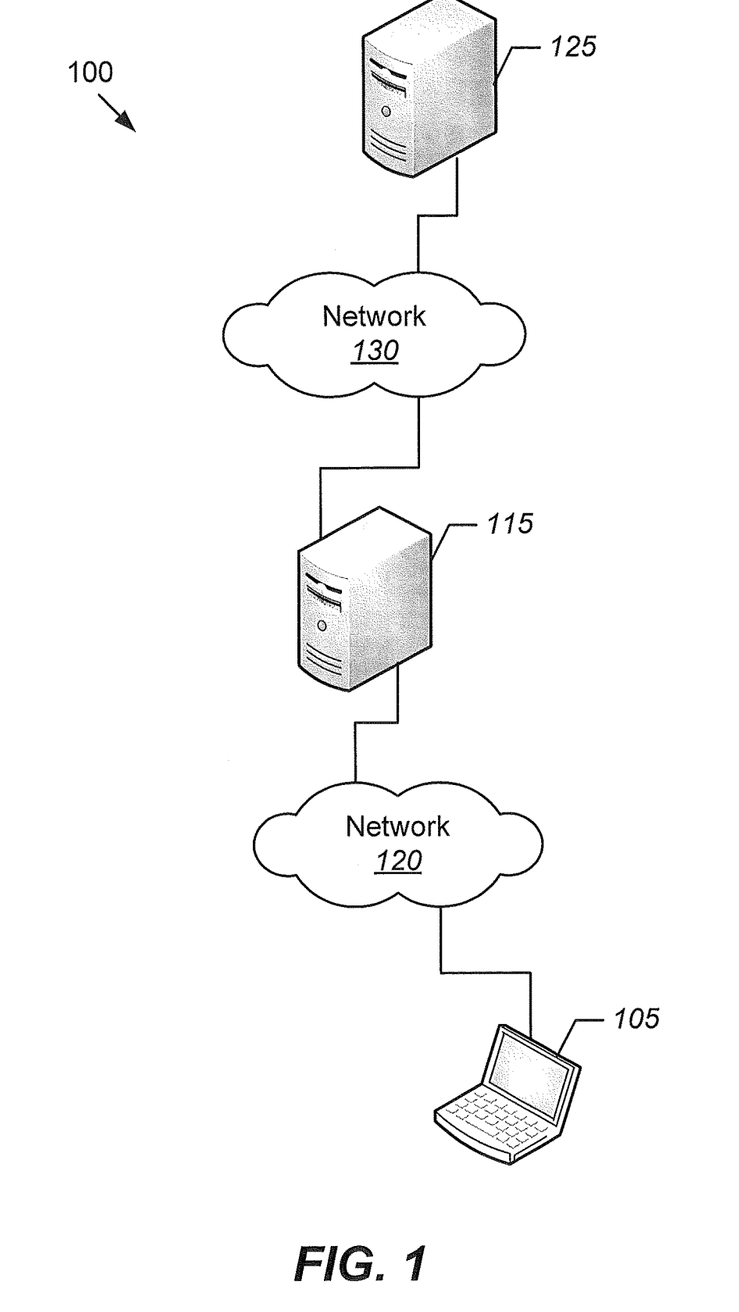
FIG. 1 is a block diagram of a webpage information retrieval environment in accordance with some embodiments of the present inventive subject matter.

Referring to FIG. 1, a webpage information retrieval environment 100, in accordance with some embodiments of the inventive subject matter, comprises end user device 105 that is coupled to a webpage processing server 115 via a network 120. The network 120 may be a global network, such as the Internet or other publicly accessible network. Various elements of the network 120 may be interconnected by a wide area network, a local area network, an Intranet, and/or other private network, which may not be accessible by the general public. Thus, the communication network 120 may represent a combination of public and private networks or a virtual private network (VPN). The network 120 may be a wireless network, a wireline network, or may be a combination of both wireless and wireline networks. In some embodiments, the user device 105 may be connected directly to the webpage processing server 115 as a keyboard/mouse device for interacting with the webpage processing server. The webpage processing server 115 communicates with webpage source server 125 via a network 130. Similar to the network 120, the network 130 may be a global network, such as the Internet or other publicly accessible network. Various elements of the network 130 may be interconnected by a wide area network, a local area network, an Intranet, and/or other private network, which may not be accessible by the general public. Thus, the communication network 130 may represent a combination of public and private networks or a virtual private network (VPN). The network 130 may be a wireless network, a wireline network, or may be a combination of both wireless and wireline networks. In other embodiments, the webpage source server 125 may be directly connected to the webpage processing server 115.

It will be appreciated that in accordance with various embodiments of the inventive subject matter, each of the webpage processing server 115 and the webpage source server 125 may be implemented as a single server, separate servers, or a network of servers either co-located in a server farm, for example, or located in different geographic regions. Moreover, in other embodiments, the functionality of the webpage source server 125 may be implemented as part of the webpage processing server 115.

As shown in FIG. 1, some embodiments according to the inventive subject matter can operate in a logically separated client side/server side-computing environment, sometimes referred to hereinafter as a client/server environment. The client/server environment is a computational architecture that involves a client process (i.e., client device 105 or webpage processing server 115) requesting service from a server process (i.e., webpage processing server 115 or webpage source server 125, respectively). In general, the client/server environment maintains a distinction between processes, although client and server processes may operate on different machines or on the same machine. Accordingly, the client and server sides of the client/server environment are referred to as being logically separated. Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

The clients and servers can communicate using a standard communications mode, such as Hypertext Transport Protocol (HTTP), SOAP, XML-RPC, and/or WSDL. According to the HTTP request-response communications model, HTTP requests are sent from the client to the server and HTTP responses are sent from the server to the client in response to an HTTP request. In operation, the server waits for a client to open a connection and to request information, such as a webpage. In response, the server sends a copy of the requested information to the client, closes the connection to the client, and waits for the next connection. It will be understood that the server can respond to requests from more than one client.

Although FIG. 1 illustrates a webpage information retrieval environment, it will be understood that embodiments of the inventive subject matter are not limited to such configurations, but are intended to encompass any configuration capable of carrying out the operations described herein.

Figure 2:
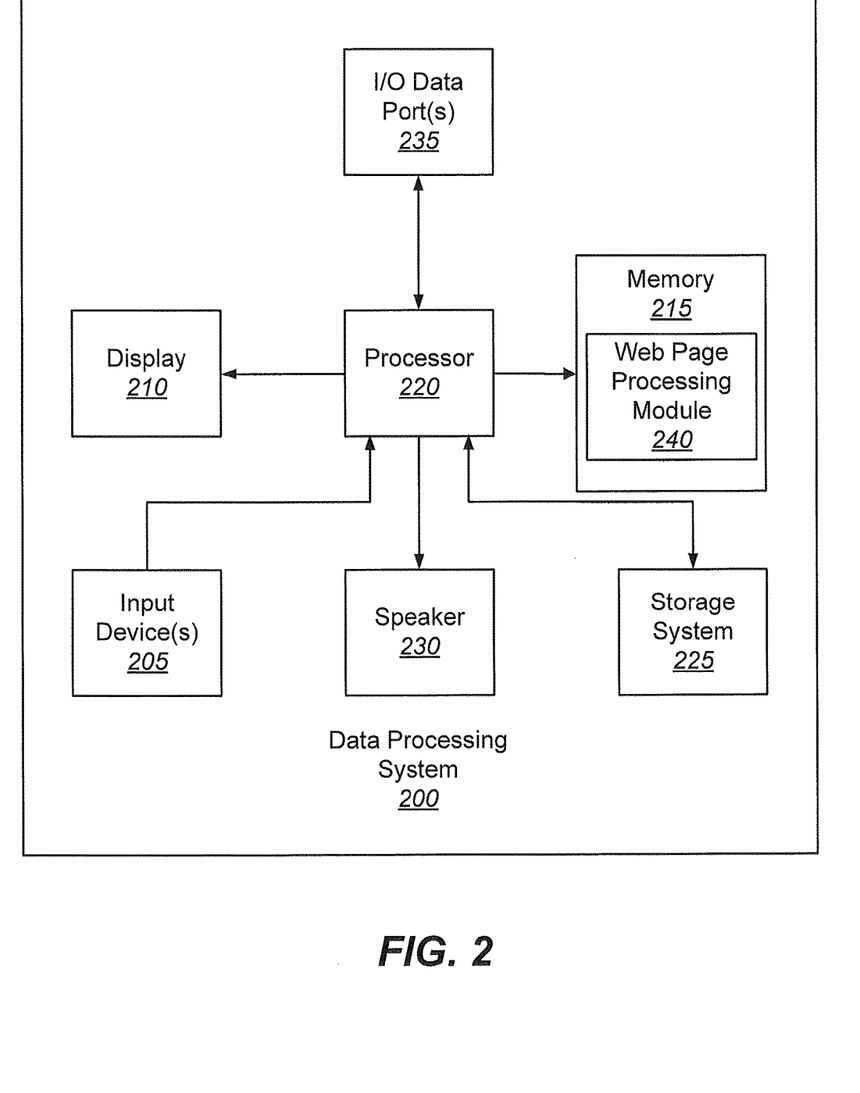
FIG. 2 is a block diagram that illustrates a data processing system including a web page processing module in accordance with some embodiments of the present inventive subject matter.

FIG. 2 illustrates a data processing system 200 that may be used, for example, to implement the data processing system 100 of FIG. 1 and may include a webpage processing module, in accordance with some embodiments of the inventive subject matter. The data processing system 200 comprises input device(s) 205, such as a keyboard or keypad, a display 210, and a memory 215 that communicate with a processor 220. The data processing system 200 may further comprise a storage system 225, a speaker 230, and an I/O data port(s) 235 that also communicate with the processor 220. The storage system 225 may include removable and/or fixed media, such as floppy disks, ZIP drives, hard disks, or the like as well as virtual storage such as a RAMDISK. The I/O data port(s) 235 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 215 may be configured with a webpage processing module 240 that may be used to retrieve information from a webpage on the data processing system 200.

Figure 3:
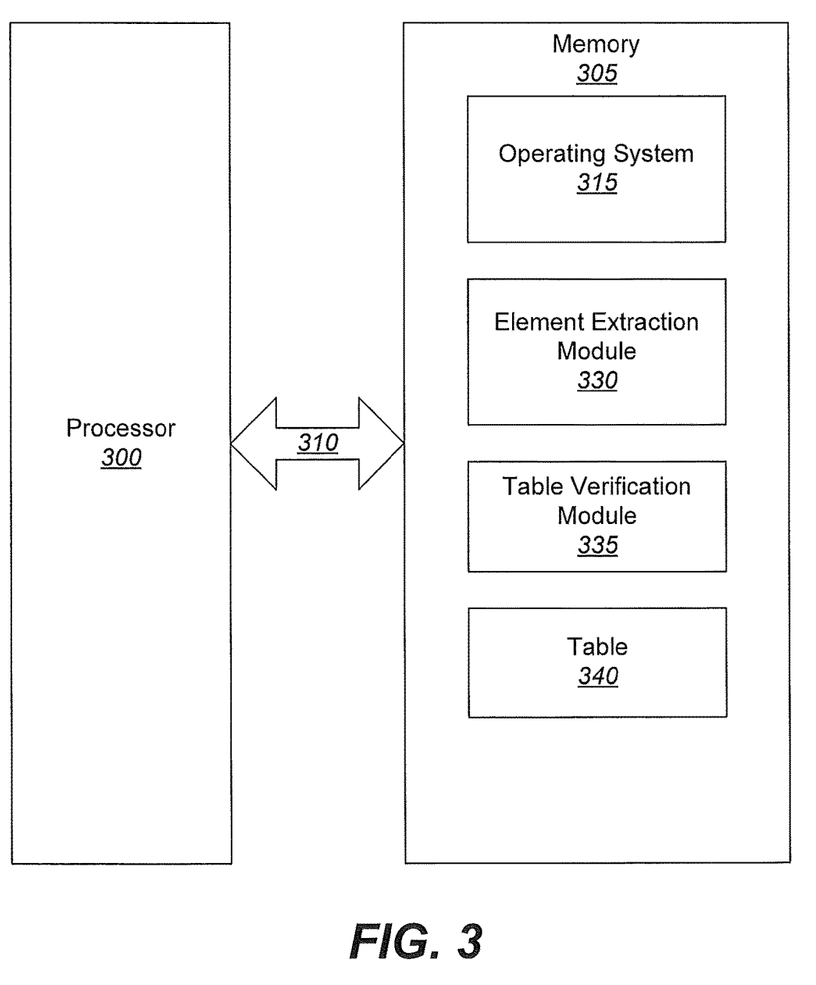
FIG. 3 is a block diagram that illustrates a software/hardware architecture for a webpage information retrieval system in a data processing system in accordance with some embodiments of the present inventive subject matter.

FIG. 3 illustrates a processor 300 and memory 305 that may be used in embodiments of data processing systems, such as the data processing system 200 of FIG. 2, for retrieving information from a webpage in accordance with some embodiments of the inventive subject matter. The processor 300 communicates with the memory 305 via an address/data bus 310. The processor 300 may be, for example, a commercially available or custom microprocessor. The memory 305 is representative of the one or more memory devices containing the software and data used to retrieve information from a webpage in accordance with some embodiments of the present invention. The memory 305 may include, but is not limited to, the following types of devices: cache, ROM, PROM, EPROM, EEPROM, flash, SRAM, and DRAM.

As shown in FIG. 3, the memory 305 may contain up to four or more categories of software and/or data: an operating system 315, an element extraction module 330, a table verification module 335, and a table 340. The operating system 315 generally controls the operation of the data processing system. In particular, the operating system 315 may manage the data processing system's software and/or hardware resources and may coordinate execution of programs by the processor 300. The element extraction module 330 may analyze a webpage from the webpage source server 125, for example, and may extract text elements therefrom. For example, a webpage may have information arranged on the webpage in a table format or other structured format, which the element extraction module 330 may recognize and extract for storage in a data structure on the webpage processing server 115. In some embodiments, the element extraction module 330 may process the extracted text elements from the webpage and store the text elements in a table 340.

The table verification module 335 may analyze the webpage to obtain the DOM structure of the page. The DOM is a cross-platform and language-independent convention for representing and interacting with objects in HTML, XHTML and XML documents. Objects in the DOM tree may be addressed and manipulated by using methods on the objects. To render a document, such as an HTML page, most web browsers use an internal model similar to DOM. The nodes of every document are organized in a tree structure, called the DOM tree, with THE topmost node named "Document object." When an HTML page is rendered in browsers, the browser downloads the HTML into local memory and automatically parses it to display the page on screen. The DOM is also the way JavaScript transmits the state of the browser in HTML pages.

Once the table verification module 335 obtains the DOM structure for the webpage, it may validate the accuracy of the text elements in the table 340 to ensure that the relationships between the text elements in the table is the same as that on the webpage as defined by the DOM structure.

Although FIG. 3 illustrates exemplary hardware/software architectures that may be used in data processing systems, such as the data processing system 200 of FIG. 2, for retrieving information from a webpage, it will be understood that the present invention is not limited to such a configuration but is intended to encompass any configuration capable of carrying out operations described herein. Moreover, the functionality of the data processing system 200 of FIG. 2 and the hardware/software architecture of FIG. 3 may be implemented as a single processor system, a multi-processor system, a processing system with one or more cores, a distributed processing system, or even a network of stand-alone computer systems, in accordance with various embodiments.

Computer program code for carrying out operations of data processing systems discussed above with respect to FIG. 3 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Figure 4:
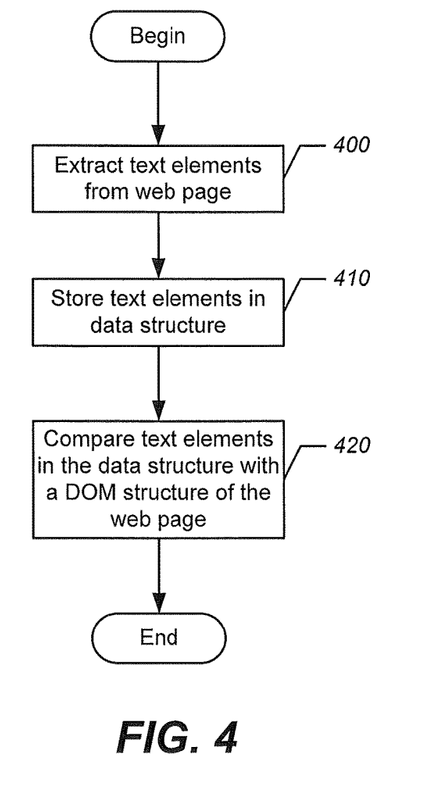
FIG. 4 is a flowchart that illustrates operations of a webpage information retrieval system in accordance with some embodiments of the present inventive subject matter.

Operations of a webpage information retrieval system, according to some embodiments of the inventive subject matter, will now be described with reference to the flow charts of FIGS. 4 and 6, and the extracted text elements table of FIG. 5. Referring now to FIG. 4, operations begin at block 400 where the element extraction module 330 extracts text elements from a webpage. At block 410, the element extraction module 330 stores the extracted text elements in a data structure. In some embodiments, all of the text elements from the webpage are stored in an element array along with their X, Y position coordinates. A plurality of row arrays can then be created based on the unique Y positions of the text elements in the element array. All text elements having a common Y position coordinate can be stored in the same row array. The collection of row arrays can be viewed together as comprising a table comprising a plurality of cells with text elements located in various ones of the cells as illustrated in FIG. 5.

Figure 5:
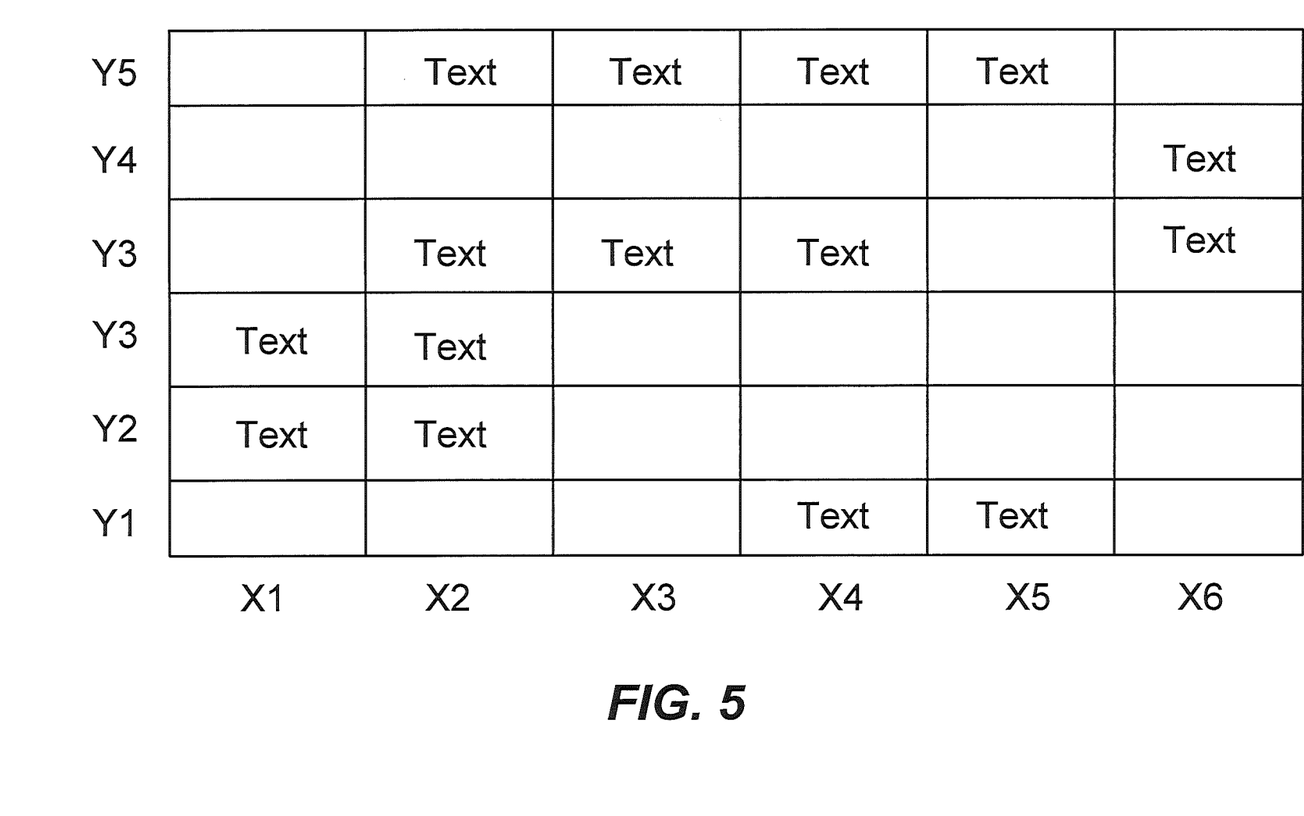
FIG. 5 is a table that illustrates operations of a webpage information retrieval system in accordance with some embodiments of the present inventive subject matter.

At block 420, the table verification module 335 compares the text elements in the data structure, such as the table of FIG. 5, with the DOM structure of the webpage. The table verification module 335 may use the XPath language to query the webpage to obtain the DOM tree comprising the nodes of the webpage. The XPath language is based on a tree representation of an XML document and provides the ability to navigate around the tree, selecting nodes by a variety of criteria. The nodes of the webpage may represent the organization of the text elements on the webpage. The table verification module 335 may view each row in the data structure or table of FIG. 5 as a node with each of the cells in a row being a sub-node. The organization of the text elements in the row nodes and row-sub-nodes may be compared with the organization of the nodes of the webpage corresponding to the text elements on the webpage as represented by the DOM tree. It will be understood that in accordance with various embodiments of the inventive subject matter, the extracted text elements table and the DOM structure of the webpage may be generated/obtained in any order, i.e., the text elements table may be generated first and then the DOM structure of the webpage obtained or the DOM structure of the webpage obtained followed by generation of the text elements table. In other embodiments, the text elements table may be generated in parallel with obtaining the DOM structure of the webpage.

Figure 6:
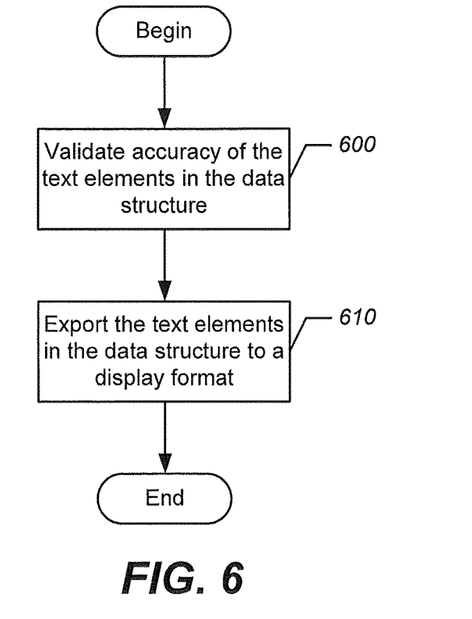
FIG. 6 is a flowchart that illustrates further operations of a webpage information retrieval system in accordance with some embodiments of the present inventive concept.

Referring now to FIG. 6, the table verification module 335 uses the comparison of the text elements in the row nodes and row-sub-nodes with the organization of the nodes of the webpage corresponding to the text elements on the webpage to validate the accuracy of the text elements in the data structure at block 600. Specifically, the text elements in the data structure or table 340 should have the same relationship with each other as the text elements on the webpage. For the rows in the table 340, they should follow a pattern as follows:

<the node that contains the whole table>
. . .
<the node of a row>
<the node of a row>
. . .
</the node that contains the whole table>

And this pattern should match the pattern of the rows used to display the elements on the webpage as represented by the DOM tree for the webpage.

Similarly, for the cells in a particular row of the table 340, they should follow a pattern as follows:

<the node of the row>
. . .
<the node of the cell>
. . .
<tag>TEXT</tag>
. . .
</the node of the cell>
. . .
</the node of the row>

And this pattern should match the pattern of the text elements in each row as displayed on the webpage as represented by the DOM tree for the webpage.

At block 610, the tale verification module 335 may export the text elements from the data structure or table 340 to an application or display format for viewing or further processing. In accordance with various embodiments, the display format may be, but is not limited to, Extensible Markup Language (XML), a spreadsheet application, or Comma-Separated Values (CSV).

The embodiments of methods, systems, and computer program products described herein may provide a system for retrieving webpage information and arranging the webpage information in a useful format, such as XML, a spreadsheet, or CSV, that can allow a user to process the webpage information further or simply display the information in a preferred format. The information can extracted based on the visual position of the information on the webpage without regard to the details of how the webpage is coded or designed. The accuracy of the information retrieval can be verified by comparing the arrangement of the extracted text elements with the DOM structure of the text elements on the webpage.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

That which is claimed:

1. A method, comprising:
performing operations as follows using a processor:
accessing a webpage that comprises text elements, the webpage being implemented via a markup language that does not provide functionality to export information from the webpage to another application or format;
analyzing visual positional information for the text elements on the webpage;
extracting the text elements from the webpage;
storing the text elements extracted from the webpage in a data structure to preserve the visual positional information for the text elements;
obtaining an object model associated with the webpage, wherein the object model comprises visual positional information for the webpage; and
validating data representing the visual positional information for the text elements using the object model associated with the webpage, wherein validating comprises validating an accuracy of the text elements in the data structure based on the object model of the webpage.

2. The method of claim 1, wherein the object model is a Document Object Model (DOM) structure.

3. The method of claim 2, further comprising:
exporting the text elements in the data structure to a display format.

4. The method of claim 3, wherein the display format is one of Extensible Markup Language (XML), a spreadsheet application, and Comma-Separated Values (CSV).

5. The method of claim 2, wherein obtaining the object model comprises:
using XPath language to query the webpage to obtain a DOM tree comprising nodes of the webpage;
wherein the nodes of the webpage represent an organization of the text elements on the webpage.

6. The method of claim 5, wherein the data structure is a table comprising cells and wherein storing the text elements in the data structure comprises storing the text elements in the cells of the table.

7. The method of claim 6, wherein the table comprises a plurality of rows, each of the rows containing a subset of the cells such that each of the rows is represented as a row node and each of the cells in the row is represented as a row sub-node and wherein validating the accuracy of the text elements in the data structure further comprises:
comparing an organization of the text elements in the row nodes and the row sub-nodes associated therewith with the nodes of the DOM tree.

8. The method of claim 7, wherein storing the text elements in the data structure comprises:
storing the text elements in an element array along with X, Y position coordinates;
creating a plurality of row arrays corresponding to unique Y positions from the first array, respectively; and
storing the text elements having a common Y position coordinate in the row array associated with the Y position coordinate.

9. A system, comprising:
a processor; and
a memory coupled to the processor and comprising computer readable program code embodied in the memory that when executed by the processor causes the processor to perform operations comprising:
accessing a webpage that comprises text elements, the webpage being implemented via a markup language that does not provide functionality to export information from the webpage to another application or format;
analyzing visual positional information for the text elements on the webpage;
extracting the text elements from the webpage;
storing the text elements extracted from the webpage in a data structure to preserve the visual positional information for the text elements;
obtaining an object model associated with the webpage, wherein the object model comprises visual positional information for the webpage; and
validating data representing the visual positional information for the text elements using the object model associated with the webpage, wherein validating comprises validating an accuracy of the text elements in the data structure based on the object model of the webpage.

10. The system of claim 9, wherein the object model is a Document Object Model (DOM) structure.

11. The system of claim 10, wherein the operations further comprise:
exporting the text elements in the data structure to a display format.

12. The system of claim 11, wherein the display format is one of Extensible Markup Language (XML), a spreadsheet application, and Comma-Separated Values (CSV).

13. The system of claim 10, wherein obtaining the object model comprises:

using XPath language to query the webpage to obtain a DOM tree comprising nodes of the webpage;

wherein the nodes of the webpage represent an organization of the text elements on the webpage.

14. The system of claim 13, wherein the data structure is a table comprising cells and wherein storing the text elements in the data structure comprises storing the text elements in the cells of the table.

15. The system of claim 14, wherein the table comprises a plurality of rows, each of the rows containing a subset of the cells such that each of the rows is represented as a row node and each of the cells in the row is represented as a row sub-node and wherein validating the accuracy of the text elements in the data structure further comprises:

comparing an organization of the text elements in the row nodes and the row sub-nodes associated therewith with the nodes of the DOM tree.

16. The system of claim 15, wherein storing the text elements in the data structure comprises:

storing the text elements in an element array along with X, Y position coordinates;

creating a plurality of row arrays corresponding to unique Y positions from the first array, respectively; and storing the text elements having a common Y position coordinate in the row array associated with the Y position coordinate.

17. A computer program product, comprising:

a non-transitory computer readable storage medium comprising computer readable program code embodied in the medium that when executed by a processor causes the processor to perform operations comprising:

accessing a webpage that comprises text elements, the webpage being implemented via a markup language that does not provide functionality to export information from the webpage to another application or format:

analyzing visual positional information for the text elements; and extracting the text elements from the webpage;

storing the text elements extracted from the webpage in a data structure to preserve the visual positional information for the text elements;

obtaining an object model associated with the webpage, wherein the object model comprises visual positional information for the webpage; and validating the data representing the visual positional information for the text elements using the object model associated with the webpage, wherein the validating comprises validating an accuracy of the text elements in the data structure based on the object model of the webpage.

18. The computer program product of claim 17, wherein the object model is a Document Object Model (DOM) structure.

19. The computer program product of claim 18, wherein the operations further comprise:

exporting the text elements in the data structure to a display format.

20. The computer program product of claim 19, wherein the display format is one of Extensible Markup Language (XML), a spreadsheet application, and Comma-Separated Values (CSV).

21. The computer program product of claim 18, wherein obtaining the object model comprises:

using XPath language to query the webpage to obtain a DOM tree comprising nodes of the webpage;

wherein the nodes of the webpage represent an organization of the text elements on the webpage.

22. The computer program product of claim 21, wherein the data structure is a table comprising cells and wherein storing the text elements in the data structure comprises storing the text elements in the cells of the table.

23. The computer program product of claim 22, wherein the table comprises a plurality of rows, each of the rows containing a subset of the cells such that each of the rows is represented as a row node and each of the cells in the row is represented as a row sub-node and wherein validating the accuracy of the text elements in the data structure further comprises:

comparing an organization of the text elements in the row nodes and the row sub-nodes associated therewith with the nodes of the DOM tree.

24. The computer program product of claim 23, wherein storing the text elements in the data structure comprises:

storing the text elements in an element array along with X, Y position coordinates;

creating a plurality of row arrays corresponding to unique Y positions from the first array, respectively; and storing the text elements having a common Y position coordinate in the row array associated with the Y position coordinate.

* * * * *